United States Patent
Gaydoul et al.

(10) Patent No.: US 10,261,230 B2
(45) Date of Patent: *Apr. 16, 2019

(54) LED LIGHTING DEVICE

(71) Applicant: Schott AG, Mainz (DE)

(72) Inventors: Ekkehard Gaydoul, Gross-Bieberau (DE); Armin Plichta, Sponheim (DE); Juergen Meinl, Hohenstein-Holzhausen (DE); Bjoern Bleisinger, Waldboeckelheim (DE); Martin Cramer, Wiesbaden (DE); Thomas Reichert, Wackernheim (DE); Marc Timon Sprzagala, Mainz (DE); Sandra Mattheis, Eltville (DE)

(73) Assignee: Schott AG, Mainz (DE)

( * ) Notice: Subject to any disclaimer, the term of this patent is extended or adjusted under 35 U.S.C. 154(b) by 35 days.

This patent is subject to a terminal disclaimer.

(21) Appl. No.: 15/266,325

(22) Filed: Sep. 15, 2016

(65) Prior Publication Data

US 2017/0031077 A1   Feb. 2, 2017

Related U.S. Application Data

(63) Continuation of application No. 14/007,787, filed as application No. PCT/EP2012/051418 on Jan. 30, 2012, now Pat. No. 9,618,671.

(30) Foreign Application Priority Data

Mar. 26, 2011 (DE) .......................... 10 2011 015 161
Oct. 6, 2011 (DE) .......................... 10 2011 084 062

(51) Int. Cl.
*F21S 41/24* (2018.01)
*F21V 8/00* (2006.01)
(Continued)

(52) U.S. Cl.
CPC ................ *G02B 6/001* (2013.01); *B60Q 3/43* (2017.02); *B60Q 3/64* (2017.02); *F21S 2/00* (2013.01);
(Continued)

(58) Field of Classification Search
CPC .......... B60Q 3/004; B60Q 3/025; B60Q 3/59; B60Q 3/62; F21S 48/1241; F21S 48/2268;
(Continued)

(56) References Cited

U.S. PATENT DOCUMENTS 4,733,332 A   3/1988 Yamashita et al.
7,188,988 B2 * 3/2007 Koganezawa ....... G02B 6/0028
                                                       362/561
(Continued)

FOREIGN PATENT DOCUMENTS

DE   202005016093   12/2005
EP   2063168        5/2009
(Continued)

OTHER PUBLICATIONS

English Translation of International Search Report dated May 14, 2012 corresponding to PCT/EP2012/051418, 3 pp.
(Continued)

*Primary Examiner* — Hargobind S Sawhney
(74) *Attorney, Agent, or Firm* — Ohlandt, Greeley, Ruggiero & Perle, LLP

(57) ABSTRACT

LED lighting devices are provided that include two optical waveguides and at least one LED in an intermediate region between end faces of the optical waveguides so that radiation from the LED is coupled into the optical waveguides through the end faces. A de-coupler is on outer circumferential surface regions of each of the two separate optical waveguides. The de-coupler reflects the radiation guided in
(Continued)

the optical waveguides so that the radiation passes through the optical waveguides and is coupled out of the optical waveguides laterally. The intermediate region has a length that is selected so that a brightness difference, measured perpendicular to an axis of the optical waveguides in the center of the intermediate region, at a distance of 10 mm perpendicular to the axis of the optical waveguides is at most 25% based on a maximum value of brightness along the axis of the optical waveguides.

16 Claims, 10 Drawing Sheets

(51) Int. Cl.
| | | |
|---|---|---|
| F21S 43/13 | (2018.01) | |
| F21S 43/237 | (2018.01) | |
| F21S 41/14 | (2018.01) | |
| F21S 43/245 | (2018.01) | |
| G02B 5/04 | (2006.01) | |
| G02B 6/02 | (2006.01) | |
| B60Q 3/64 | (2017.01) | |
| B60Q 3/43 | (2017.01) | |
| F21S 2/00 | (2016.01) | |
| F21W 106/00 | (2018.01) | |
| F21W 107/30 | (2018.01) | |
| F21S 41/141 | (2018.01) | |
| F21Y 115/10 | (2016.01) | |
| B64D 11/00 | (2006.01) | |
| B60Q 3/62 | (2017.01) | |
| F21W 121/00 | (2006.01) | |

(52) U.S. Cl.
CPC .............. *F21S 41/14* (2018.01); *F21S 41/24* (2018.01); *F21S 43/13* (2018.01); *F21S 43/237* (2018.01); *F21S 43/245* (2018.01); *G02B 5/04* (2013.01); *G02B 6/02* (2013.01); *B60Q 3/62* (2017.02); *B64D 11/00* (2013.01); *F21S 41/141* (2018.01); *F21W 2106/00* (2018.01); *F21W 2107/30* (2018.01); *F21W 2121/00* (2013.01); *F21Y 2115/10* (2016.08); *G02B 6/008* (2013.01); *G02B 6/0038* (2013.01); *G02B 6/0068* (2013.01); *G02B 6/0073* (2013.01)

(58) Field of Classification Search
CPC ...... F21S 48/2281; F21S 48/236; F21S 2/005; F21S 41/141; F21S 41/24; F21V 2200/15; G02B 6/0006; G02B 6/001; G02B 6/0021; G02B 6/0028; G02B 6/0031; G02B 6/0038; G02B 6/0068; G02B 6/0073; G02B 6/0091; G02B 6/0078; G02B 6/008; F21W 2106/00; F21Y 2115/10; B64D 2011/0038
See application file for complete search history.

(56) References Cited

U.S. PATENT DOCUMENTS

| | | | |
|---|---|---|---|
| 7,980,747 | B2 | 7/2011 | Vissenberg et al. |
| 8,259,253 | B2* | 9/2012 | Yoo ..................... G02B 6/0085 349/62 |
| 8,646,928 | B2* | 2/2014 | Liang .................. G02B 6/0091 362/612 |
| 2006/0245213 | A1 | 11/2006 | Bell et al. |
| 2006/0262564 | A1 | 11/2006 | Baba |
| 2007/0279941 | A1 | 12/2007 | Koshio |
| 2008/0151553 | A1 | 6/2008 | Okamoto et al. |
| 2009/0052207 | A1* | 2/2009 | Chen ..................... G02B 6/001 362/616 |
| 2009/0122227 | A1 | 5/2009 | Hong et al. |
| 2010/0053955 | A1 | 3/2010 | Vissenberg et al. |
| 2011/0102707 | A1 | 5/2011 | Yoo |
| 2011/0103757 | A1 | 5/2011 | Alkemper et al. |

FOREIGN PATENT DOCUMENTS

| | | |
|---|---|---|
| EP | 2063296 | 5/2009 |
| EP | 2299161 | 3/2011 |
| WO | 2009100834 | 8/2009 |
| WO | 2009134572 | 11/2009 |
| WO | 2011035081 | 3/2011 |

OTHER PUBLICATIONS

English Translation of Written Opinion dated Sep. 26, 2013 corresponding to PCT/EP2012/051418, 5 pp.
English Translation of German Office Action dated Mar. 15, 2013 corresponding to German Patent App. No. 10 2011 084 062.1, 5 pp.
English Translation of German Office Action dated Jun. 17, 2013 corresponding to German Patent App. No. 10 2011 084 062.1, 5 pp.

* cited by examiner

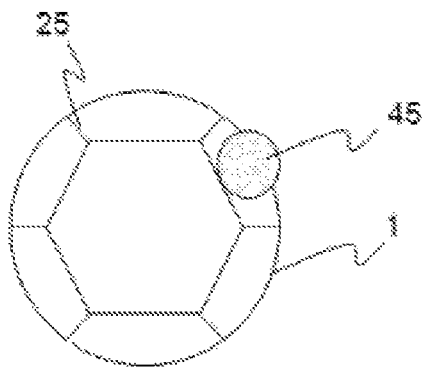
Figure 11
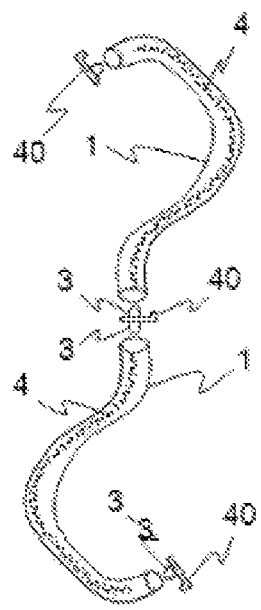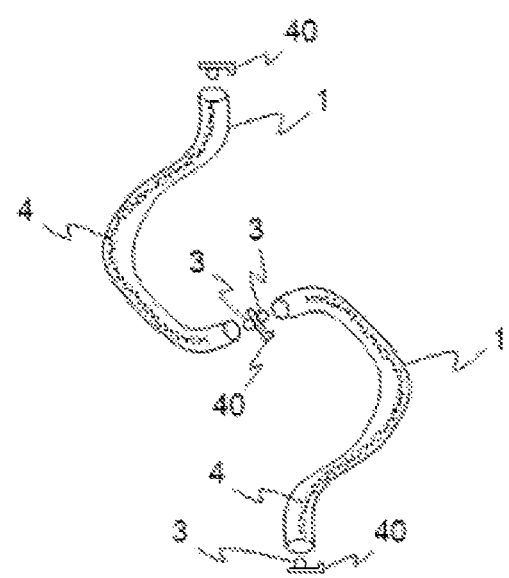
Figure 12a          Figure 12b

LED LIGHTING DEVICE

CROSS REFERENCE TO RELATED APPLICATIONS

This application is a continuation U.S. application Ser. No. 14/007,787 filed Nov. 22, 2013, now pending, which is a U.S. National Stage entry application under 35 U.S.C. § 371 of PCT/EP2012/051418 filed on Jan. 30, 2012, which claims benefit under 35 U.S.C. § 119(a) of German Patent Application No. 10 2011 015 161.3 filed Mar. 26, 2011 and German Patent Application No. 10 2011 084 062.1 filed Oct. 6, 2011, the entire contents of each which are incorporated herein by reference.

BACKGROUND

1. Field of the Invention

The invention relates to an LED lighting device and to the uses thereof. LEDs (light-emitting diodes) are increasingly gaining in importance as light sources, for one, because they are considered to be energy efficient, and second, because they have a long lifetime and are thus expected to require low maintenance outlay.

2. Description of Related Art

An LED is an electronic semiconductor device. If power is supplied to it, it emits electromagnetic radiation, the wavelength of which can be in the infrared, visible and/or in the ultraviolet spectral range. The term LED, used in the present description, includes no limitation to a particular wavelength of the emitted radiation.

It is likewise possible for a plurality of emitting active elements to be mounted on a chip, which is likewise referred to as an LED in the context of the present description. Furthermore, no limitation in terms of the coherence length of the emitted radiation is associated with the term LED used herein either, such that laser diodes are likewise comprised by said term.

One property of LEDs which is disadvantageous for lighting applications, however, is based on the fact that commercially available LEDs are supplied in an encapsulation which includes a reflector and/or a lens which allow the radiation emitted by the LED to be irradiated forward at a relatively low viewing angle. Therefore, fluorescent tubes are still often used for lighting larger surface areas. Said fluorescent tubes, however, have the disadvantage that they can break easily, which is a problem in particular in applications in which strong vibrations or other mechanical stresses can occur, but also that they require a relatively high ignition voltage, which accordingly requires complicated electronic devices for the power supply and can likewise emit spurious electromagnetic radiation. Another disadvantage of fluorescent tubes is that they emit heat and UV radiation on their luminous surfaces.

In order to circumvent in particular the last-mentioned disadvantage, U.S. Pat. No. 4,733,332 proposes to couple light emitted by an incandescent lamp or gas-discharge lamp into the end face of a glass rod, which is provided with a line-shaped diffusion pattern on its lateral surface. The glass rod acts as an optical waveguide for the light that has been coupled in, the diffusion pattern couples it out of the glass rod in a manner in which it reflects the impinging light into the glass rod, allows it to pass through it and, on the opposite side of the glass rod, to be coupled out laterally therefrom. In this manner, a line-shaped lighting profile with a viewing angle, which can correspond to a fluorescent tube with reflector, is produced. Aside from the usual disadvantages of the proposed light sources, the proposed apparatus has the disadvantage that it cannot be used to produce light sources of arbitrary length in the form of luminous bands, because as the length of the glass rods increases, the brightness loss in the center of the glass rod would increase in an unacceptable manner.

EP 2063168 A1 describes an LED light system, in which the light emitted by the LEDs is coupled into the end face of an optical waveguide, which is mounted on a base section. The optical waveguide itself has, on its surface, no coating to direct the guided light perpendicular to the axis of the light system, but the base section includes the reflector, which is meant to ensure expanded emission angles. This lighting device has the disadvantage that the observer will perceive the optical waveguide quasi as a shadow in front of the reflector. Furthermore, the light must be coupled out of the optical waveguide and then be reflected by the reflector such that intensity losses must be expected. If such lighting devices are arranged one behind the other, an enormous brightness drop can be observed in the intermediate spaces, because the LEDs are mounted in their own packages on the base section and thus necessarily cause a large spacing between the optical waveguides which are arranged one behind the other. The disclosed LED light system cannot be used to realize a homogeneously emitting luminous band.

SUMMARY

Against this background, it is an object of the invention to provide an LED-based lighting apparatus, using which a light source of arbitrary length and with as few local brightness differences along its longitudinal axis as possible can be produced.

The LED lighting device according to the invention comprises at least two optical waveguides. Each of these optical waveguides has at least one end face. The optical waveguides are arranged such that an end face of one optical waveguide and the nearest end face of the other optical waveguide have a distance A with respect to one another. These end faces thus form an intermediate region having the length A. In simplified terms, the intermediate region is located between the mutually facing end faces of the optical waveguides. The optical waveguides are preferably arranged such that they are located on the extension of their respective longitudinal axes. The result is a linear arrangement of the optical waveguides, which in the operating state appears to the user as a luminous band. However, an offset arrangement is likewise possible, in which the end faces of the optical waveguides are not located directly opposite one another. They are still facing one another according to the invention. The optical waveguides are preferably rigid, although the principle of the invention is likewise realizable with flexible optical waveguides.

The intermediate region is used to couple the radiation emitted by at least one LED into the end faces and thus into the optical waveguides in the operating state. In order that the radiation guided in the optical waveguides can be used in terms of a lighting device, means for coupling out radiation are located in the outer circumferential surface region of the optical waveguides. In the operating state, i.e. when current flows through the LED, the radiation emitted by the at least one LED is injected into the optical waveguide through the end face and guided by said optical waveguide by way of total internal reflection. The means for coupling out the radiation ensure that the radiation impinging thereon is reflected into the optical waveguide and passes through the optical waveguide and is coupled out of the optical waveguide laterally, that is to say to the sides or by exiting from its outer circumferential surface. The distance A and thus the length A of the intermediate region is selected such that in the operating state the resulting brightness difference $\Delta I$, in the center of the intermediate region, at a distance of 10 mm perpendicular to the axis of the optical waveguides is at most 25%. This value is based on the maximum value of the brightness, which is measured along the axis of the optical waveguides at the same distance perpendicular to the axis thereof. The brightness along the axis of the optical waveguides and in the intermediate region is always measured from the direction of the user, that is to say from the direction of the radiation exiting the optical waveguides through the means for coupling out the radiation.

At a distance of 20 mm perpendicular to the axis of the optical waveguides, the brightness difference $\Delta I$ in the center of the intermediate region is here preferably at most 5%, based on the maximum value along the axis of the optical waveguides. In order to determine this value $\Delta I$, the intensity of the radiation, which is emitted in the operating state by the lighting device and impinges on a diffusing screen, is measured at a position in the center of the intermediate region and at a distance of 10 mm perpendicular to the axis of the optical waveguides. Subsequently, the difference between the maximum value of the intensity along the axis of the optical waveguides and the value of the intensity in the center of the intermediate region is formed. This difference value is then correlated with the mentioned maximum value of the intensity. As a result, the following equation applies:

$$\Delta I=(I\text{max}-I\text{min})/I\text{max}.$$

Imax is the described maximum value of the intensity, and Imin is the value of the intensity in the center of the intermediate region. The numerical value of $\Delta I$ is given, according to the description, in percentages, important is the amount of the difference between Imax and Imin.

If the measurement values for Imax of the two optical waveguides differ, that measurement value is used which corresponds to the highest measured intensity. Typically, the brightest spot is in the vicinity of the respective end face. In this manner, the value for the brightness drop becomes a measure of the brightness fluctuations along the axis of the lighting apparatus which are perceivable by the user. It is desirable that said brightness fluctuations are as low as possible. Since the human eye does not perceive brightness differences linearly, but reacts approximately logarithmically in terms of the perception to brightness differences, a measured value of $\Delta I$ of 25% or less means a brightness difference which is hardly perceivable by human observers.

The diffusing screen to be used for the measurement is mounted at the relevant distance from the LED lighting device, and the LED lighting device is placed in the operating state. It is also possible to use a sheet of paper, for example, as the diffusing screen, which is preferably mounted on a carrier, for example a transparent glass pane. The diffusing screen has a very large acceptance angle and thus renders the measurement comparable to the behavior of the human eye. The intensities of the radiation impinging on the diffusing screen can be measured using suitable measures, for example by recording the rear side of the diffusing screen using a digital camera, wherein the local light values can subsequently be read out using an image processing program. Other suitable methods for measuring the intensity profile on the diffusing screen are likewise possible and known to the person skilled in the art.

The measurement can be repeated at other distances, wherein the brightness differences $\Delta I$ reduce as the distance increases, owing to blooming of the intermediate region which increases with the distance. The measurement values of $\Delta I$ thus depend strongly on the two parameters length A of the intermediate region and distance of the measurement perpendicular to the axis of the optical waveguides. If the intention is to compare different lighting devices with one another, this comparison must be carried out at the same distance from the optical waveguides.

Is it is possible, and comprised by the invention, to arrange the LED outside the axis of the optical waveguides. The radiation emitted thereby can be coupled into the end faces of the optical waveguides using means for beam deflection, for example using mirrors and/or using prisms. This makes it possible for the radiation emitted by an LED to be coupled into the two opposite end faces of the optical waveguides.

The end faces of the optical waveguides at the ends which are remote from the intermediate region can be rendered reflective, which is preferred if the lighting device is configured with a single LED in the intermediate region. In lighting devices with very limited lengths and/or very expensive LEDs, this can be advantageous. However, it is likewise possible for in turn in each case at least one further LED to be located at the end faces of the optical waveguides that are remote from the intermediate region, which further LED for its part can inject radiation into the respective optical waveguide.

A core principle of the invention is that the distance between the LED and the end face associated therewith is selected to be as small as possible and thus the intermediate region becomes as short as possible, i.e. that the value of A has a numerical value which is as low as possible. This small distance makes it possible that in this preferred embodiment no further optical devices are located between the respective LED and the respective end face associated therewith. Further optical devices in this case are understood to refer to in particular beam-focusing and/or beam-deflecting optical devices, such as focusing lenses and/or collimator systems, which must be used as a matter of principle for larger distances in order to be able to couple sufficient radiation emitted by the LED into the optical waveguide. However, it is of course possible, and comprised by this wording, that the LED itself can be encapsulated by optical devices or said LED can have the optical devices which are frequently present in the delivery state and are directly connected thereto. Owing to the small distance, additional optical devices are thus made redundant and, in addition, the brightness difference $\Delta I$ is reduced.

At least each end face of the optical waveguides which is adjacent to the intermediate region is preferably assigned at least one LED.

In a particularly preferred embodiment, the distance between the respective LED and the respective end face of the optical waveguide associated therewith is at most 3 mm, particularly preferably at most 1 mm. These distances are measured from the end of the respective LED package to the end face of the respective optical waveguide, it thus corresponds to the length of the free-beam region between the LED package and the end face of the respective optical waveguide.

The LED or the LEDs and possibly at least one carrier element and/or electronic connection components of the LEDs are located in the intermediate region between the nearest end faces of the optical waveguides. The length A of the intermediate region is preferably selected to be as short as possible in accordance with the preceding statements. The length A of the intermediate region is preferably at most 15 mm, particularly preferably at most 12 mm or at most 10 mm, very particularly preferably at most 8 mm.

The optical waveguides themselves can consist of any suitable materials, for example plastics and/or glass. However, it is preferred that the optical waveguides consist, preferably at least in their core region, of a multicomponent glass. A multicomponent glass, also referred to as mineral glass, is obtained from melting more than one raw material and contains the oxides of more than one chemical element. This differentiates it from quartz glass, which consists only of $SiO_2$.

The optical waveguides consist preferably at least in their core region of a glass which contains: 70%-85% $SiO_2$, 8%-20% $B_2O_3$ and individually or in sum 2%-8% $Na_2O$ and/or $K_2O$ and/or $Li_2O$. This means that not each of the stated alkali metals must be contained in the glass, but at least one in the stated minimum amount. Further preferred optional components are up to 7% $Al_2O_3$ and individually or in sum up to 5% MgO and/or CaO and/or BaO and/or ZnO. All percentages stated in this description are given in weight percent (% by weight) on oxide basis. The glass in sum preferably contains at most 50 ppm $Fe^{2+}$ and/or $Fe^{3+}$, preferably at most 20 ppm, particularly preferably at most 10 ppm. Further components are optional, however the proportion of heavy metals such as Pb, Cd, Hg and Cr is preferably less than 100 ppm.

Such a glass is distinguished by its excellent resistance against attacks by water, acids and lyes. It in particular corresponds to hydrolytic class HGB1 according to ISO 719, an acid resistance class S1 according to DIN 12116 and alkaline resistance class A2 according to ISO 695. During operation of the lighting apparatus, the optical waveguides can very easily come into contact with water, acids or lyes, for example in the form of air humidity, vapors of operating substances and/or solvents and/or cleaning agents. A lower resistance of the glass of the optical waveguide could result in blinding thereof, as a result of which the optical waveguides could be limited in terms of function thereof, and in the end the lighting apparatus could become unusable. Therefore, the excellent resistance of the preferred glass results in a long lifetime of the lighting apparatus, even under adverse conditions.

The optical waveguides particularly preferably consist, at least in their core region, of a glass which contains: 75%-85% $SiO_2$, 8%-15% $B_2O_3$, individually or in sum 2%-8% $Na_2O$ and/or $K_2O$ and/or $Li_2O$, optionally 0%-5% $Al_2O_3$ and optionally individually or in sum 0%-2% MgO and/or CaO and/or BaO and/or ZnO. The previously mentioned condition relating to the contents of $Fe^{2+}$ and/or $Fe^{3+}$ of course also applies to these particularly preferred glasses.

The glass preferably has a modulus of elasticity E, also referred to as Young's modulus, of at most $66\cdot10^3$ N·mm$^{-2}$. The smaller the numerical value of E, the lower the stiffness of the relevant component, in this case of the in particular rigid optical waveguide made of the mentioned glass. It has been found that the modulus of elasticity E correlates to the resistance of the glass with respect to vibrations, specifically in a manner such that, the less stiff the optical waveguide, the better it withstands the vibrations. This means that what is strived for is that the value for the modulus of elasticity E of the glass of the optical waveguides should be as low as possible in order to ensure a good vibration resistance. Vibrations can damage an optical waveguide made of glass in particular in that cracks form therein, which can result in breakage of the optical waveguide and/or flaking of material.

Both are undesired and can result in failure of the lighting device. In comparison with the mentioned value for the modulus of elasticity E of at most $66\cdot10^3$ N·mm$^{-2}$, quartz glass, as is known for lighting apparatuses from the prior art, has a modulus of elasticity E of $72.5\cdot10^3$ N·mm$^{-2}$. As already described, it is much more brittle than the multicomponent glass according to the invention and can withstand vibration stresses less well.

The multicomponent glass contains in a particularly preferred embodiment at most 50 ppm (parts per million) of $Fe^{2+}$ and/or $Fe^{3+}$. In particular for greater lengths of the optical waveguides, the iron proportion of the glass can, on account of the optical waveguide itself, result in a shift of the color spectrum of the radiation guided therein, which would make an emission of purely white radiation impossible. In other words, this means that, in optical waveguides made of glass, which contain a higher proportion of $Fe^{2+}$ and/or $Fe^{3+}$ than 50 ppm, if white light were to be guided therein, a color cast would be observable upon exit of the light, which is undesired for lighting applications or at least disadvantageous.

Here, $Fe^{2+}$ and/or $Fe^{3+}$ can be present in the glass in the form of ions, or in the form of oxides, for example FeO and/or $Fe_2O_3$. Iron often passes into glasses due to contamination of the raw materials which are used in the melting of the glass, but also due to the use of steel components which come into contact with the glass melt. Therefore, particularly pure raw materials are preferably used in the production of the glass rods, which are part of the lighting apparatus according to the invention.

The use of glass as a material for the optical waveguides typically has, compared to those made of plastics, the advantage of a higher intrinsic transmission of the optical waveguides and thus a better light intensity of the lighting device. Moreover, a lighting apparatus according to the invention having optical waveguides made of glass is fireproof, i.e. it meets high requirements of fire safety, as are required for example as authorization regulations for various applications. This criterion is important for operational capability, for example, in aviation and/or in laboratory spaces and/or in hot environments.

According to the invention, the means for coupling out the radiation are applied in the outer circumferential region of the optical waveguides. If the optical waveguides are configured as a glass rod, the radiation is guided in the glass rod at the boundary surface of the glass rod by total internal reflection with respect to the surrounding medium, typically air. The means for coupling out the radiation are in this simplest case arranged directly outside on the optical waveguide and thus on its outer circumferential surface.

However, it is likewise possible for the exemplary rod-shaped optical waveguide to consist of a core region made of said glass, which is surrounded by a further glass with a lower refractive index. The total internal reflection necessary for guiding light then takes place at the boundary surface between the core glass and the cladding glass having the lower refractive index. The means for coupling out the radiation can be arranged on the core glass and be covered by the cladding glass, or on the cladding glass itself in the case of a suitable choice for example of the refractive indices of the glasses. As compared to the core, the thickness of the surrounding cladding(s) however is comparatively low. For this reason, the term outer circumferential surface region in the context of the invention does not only refer to the external circumferential surface of the optical waveguides, but to a surface which is located in the outer periphery of the optical waveguides, that is to say also at a specific depth near the upper surface. Thus, it is likewise possible, and comprised by the invention, that the means for coupling out the radiation and/or the optical waveguides are covered by at least one further layer, for example a protective layer, independently of whether the means for coupling out the radiation are located directly on the core or on a cladding surrounding it. In this case, the invention may provide for the optical waveguides to be configured as side-emitting optical waveguides, in which the means for coupling out the radiation are formed by scatter centers in the boundary surface between core and cladding. Such optical waveguides are described in WO 2009/100834 A1.

In the simplest form, means for coupling out the radiation are, however, printed and/or adhered and/or sprayed onto the cladding surface. In that case, as a layer they are located directly on the outer circumferential surface. However, it is likewise possible for the means for coupling out the radiation to be produced by way of texturing the cladding surface, for example by way of roughening. Likewise possible is the application of layers, for example reflective layers, by way of physical vapor deposition (PVD), plasma induced chemical vapor deposition (PICVD), and/or sputtering. The simplest way, however, is the printing or spraying on, for example of white ink. Depending on the application, however, all conceivable other colors are also possible. On account of the preferably at most low degree of discoloration of the injected light through the optical waveguide according to the invention, the color emitted by the lighting device can thus be adjusted simply by way of the color of the means for coupling out the radiation. Alternatively, a color filter can be introduced into the beam path.

The optical waveguides preferably have at least at in each case one of their respective ends, adjoining their end faces, at least one chamfer. The chamfer results in the cross-sectional area of the end face being smaller than the cross-sectional area of the optical waveguide in its center. The chamfer itself is preferably configured such that it has at least one substantially planar side surface. It has been found that such a chamfer does not appreciably deteriorate the coupling efficiency of the LEDs into the end faces. The chamfer is preferably used to ensure a defined installation position of the optical waveguides, preferably with the use of a mechanical abutment, as described further below.

For fixing the LED lighting device to other objects, a mounting body is provided, which assumes this function. In a preferred embodiment, the mounting body is thermally conductively connected to at least one carrier element or, in short, carrier, on which the at least one LED is mounted in the intermediate region described previously. The carrier and the mounting element are preferably configured as one part. The carrier can in that case for example be a strip, which was cut out of or stamped out of or bent off from the mounting element. The mounting element itself is preferably a profiled section made of sheet metal, the carrier element is correspondingly a sheet-metal strip.

The carrier and the mounting element which is thermally conductively connected to the carrier serve in this embodiment as a heat sink for the at least one LED. This counters the problem of the generation of heat which frequently occurs when using LEDs, in particular light-intensive high-power LEDs. If the LED becomes too hot, in the extreme case it can be destroyed or at least emit less used radiation. Another effect caused by the operating temperature is what is known as color shift, which means that the spectrum of the emitted radiation of the LED changes in dependence on the operating temperature.

Within the meaning of the invention, all available LEDs, be it an individual LED or LED chips, can be used as LED. This likewise includes laser diodes, if the application of the lighting device requires this. However, LED chips in SMD construction are particularly preferred, because they can be used to provide particularly cost-effective lighting devices for general lighting purposes. The LED is likewise preferably an LED chip, which comprises in particular an RGB, RGBA, RGBW or RGGB chip. Furthermore, it can be assigned particularly preferably a sensor (and measures which are described below by way of example) for controlling the color space and/or the brightness of the emitted radiation of the LED. It is possible here for the sensor to be located on the LED chip, or it can be integrated at another location in the beam path. It is likewise possible for the sensor to be located at any arbitrary point of the optical waveguide. It is likewise possible for the sensor to be located the sensor above or below the optical waveguide, preferably mounted on the mounting body. In this embodiment, it preferably detects light scattered by the optical waveguide. Likewise possible is an arrangement behind the LEDs and/or behind the LED chip, if they are at least partially transmissive for radiation.

The LED and/or the chip is typically assigned evaluation and control electronics, which determine the color space and/or the brightness, whereupon the LED or the LED chip is driven such that specific operating states of the LED are set. By way of targeted driving of the elements of the chip, color mixing of the emitted radiation occurs. In this manner it is possible for example for light of any desired color to be emitted by the LED and thus the lighting device. As already described with respect to the color shift, the color space can, however, vary depending on the ambient conditions, in particular the temperature, but also the age of the LED. This variation cannot be determined, which is why the sensor is intended to measure the intensity of the radiation and its color space. By taking account of these values when driving the LED or LED chips, a reproducible and permanently stable color space and a reproducible and permanently stable intensity of the radiation emitted by the lighting device can be achieved.

The installation position of the optical waveguides determines, on account of the means for coupling out the radiation applied thereon, the lighting space during operation. In a particularly preferred embodiment, the carrier therefore has at least one abutment, which interacts with the previously described chamfer of the optical waveguides such that the result is a defined installation position of the optical waveguides and thus of the means for coupling out the radiation relative to the mounting body. In simplified terms, this means that the twisting of the optical waveguides with respect to the mounting body on account of the abutment is prevented and/or during installation the twisting of the optical waveguides and thus their position with respect to the mounting body is defined.

The abutment itself can be configured in any suitable manner. It is preferably a mechanical abutment, which is in contact with the chamfer of the optical waveguides. By way of example, it may be configured as a pin which protrudes from the carrier in the direction of the optical waveguides. Other forms are likewise conceivable, for example structures following the form of the chamfer at least in sections.

The optical waveguides themselves are not necessarily round, i.e. they do not necessarily have a circular cross-sectional area. They can, for example, have an oval cross-sectional area, or, for example, a cross-sectional area which is flattened on the side of the means for coupling out the radiation. Any suitable form is conceivable and comprised by the invention. Nor do the optical waveguides within the meaning of the invention have to be straight. Any form is possible and comprised by the invention.

In order to produce an emission profile that is as homogeneous as possible, the means for coupling out the radiation are formed by a coating, which is applied at least sectionally on the optical waveguides and is configured, preferably by variation of its density and/or structure and/or geometric pattern and/or composition, such that, in the operational state, the drop in intensity of the radiation guided in the optical waveguide, which increases with the distance from the LED, is at least partially compensated. In this manner, it is possible to achieve the impression of a largely homogeneously emitting light source for the user. All methods suitable for applying the coating are possible, however, printing methods are preferred, in particular screen printing or pad printing. A preferred geometric pattern for the means for coupling out the radiation is a sawtooth structure. The height and width of the individual teeth and their distance from one another can be adjusted in a suitable manner along the axis of the optical waveguides according to the requirements in order to achieve the desired lighting profile, in particular the desired intensity distribution.

It is likewise possible, and comprised by the invention, for a plurality of the described lighting devices according to the invention to be arranged next to one another, for example preferably next to one another in extension of their respective longitudinal axes. In that case, an intermediate region, into which the radiation of in each case at least one LED can be coupled, is located between each of the optical waveguides used. This embodiment is preferred in order to produce particularly long lighting devices. The lighting device according to the invention thus preferably forms a module of a larger lighting arrangement, in which the lighting device according to the invention repeats as often as desired. Located at the respective terminating end faces of the lighting arrangement is preferably at least in each case one LED, which emits radiation into the terminating optical waveguide in the operating state.

During operation of the LED lighting device, heat can be generated, as described, but it is likewise possible for the LED lighting device to be located in surroundings which can have strong temperature fluctuations. The components of the lighting device, in particular the optical waveguides and the holding means thereof, generally have different coefficients of thermal expansion. As a result, said components can move with respect to one another in the case of changing temperatures. If said components abut in the process, they can become damaged and/or misaligned. Provision is therefore made for the holders, which connect the optical waveguides in the lighting device, to be configured such that an axial displacement of the optical waveguides is possible. With this measure it is likewise possible for manufacturing tolerances in particular with respect to the length of the optical waveguides to be compensated. Mounting is likewise simplified.

Provision is likewise made for the holders of the optical waveguides to be configured such that they can absorb vibrations of the optical waveguides even in the direction perpendicular to their longitudinal axes. This can be achieved by at least some holding means being deflectable substantially perpendicular to the longitudinal axis of the optical waveguides and returning after the deflection into their original position. In addition to the design of these holders, this can be achieved by a suitable choice of material, for example thermoplastics.

The lighting device according to the invention has the particular advantage that, owing to the low perceivable brightness differences $\Delta I$ in the intermediate region, it can be coupled together to form a chain of lighting devices of arbitrary length, which have a largely homogeneous lighting profile for the user. Moreover, fireproof materials can can be used, in particular optical waveguides made of glass. The latter are, owing to the preferred choice of the glass, also vibration resistant. This renders the lighting apparatus particularly suitable for use in interior spaces of aircrafts, for which particular safety requirements apply. Particularly preferred uses are therefore in aircraft cabins and/or aircraft cargo spaces.

Their advantages can, however, also be used in a beneficial manner in the interior spaces of other transport means, such as trains or motor vehicles (cars and trucks).

Further advantageous and preferred uses are generally luminous elements in vehicles, preferably daytime running light and/or position light at the front of motor vehicles and/or as an element of their front headlights, or as an element of the rear lights in motor vehicles.

A further preferred use of the lighting device according to the invention is as an element of a designer lamp and/or a household lamp and/or an office lamp. Further preferred users are shelf lighting, in particular in retail shelves, cabinets and other furniture, including kitchen appliances such as refrigerators and/or stoves or cooling spaces.

The lighting device according to the invention can generally also be used for lighting external spaces, for example squares or parking levels, streets, alleys, platforms, stations, tunnels and so on. Facades or interior spaces of houses can likewise be preferred areas of use.

BRIEF DESCRIPTION OF THE DRAWINGS

The invention will be explained in more detail below with reference to the drawings. The drawings are schematic, and the scales and dimensions do not have to correspond to the actual objects.

FIG. 11: shows the cross section of an optical waveguide with chamfer and carrier with abutment.

FIG. 12*a*: shows a described lighting device having a chain with bent optical waveguides.

FIG. 12*b*: shows a described lighting device having a chain with bent optical waveguides.

DETAILED DESCRIPTION

Figure 1:
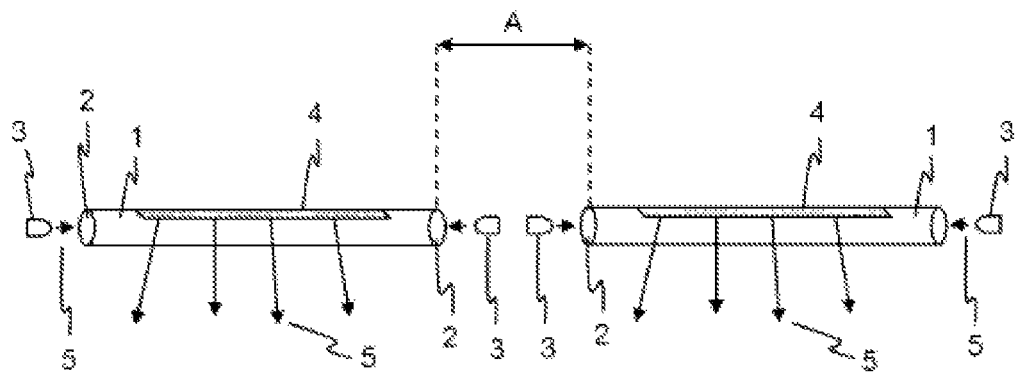
FIG. 1: shows the longitudinal section through a described lighting device.

FIG. 1 shows the principle of the LED lighting device according to the invention in a schematic longitudinal section. Radiation (5) is emitted by the LEDs (3) in the operating state. The LEDs (3) are arranged in front of the respective end face (2) of the optical waveguides (1) and in the intermediate region between the mutually opposing end faces (2) of the optical waveguides (1). The intermediate region has the length A, which corresponds to the distance A between said end faces (2). No further optical devices are used for coupling the radiation (5) into the optical waveguides. Means for coupling out the radiation (4) which is emitted by the LED (3) in the operating state are present in the outer circumferential surface region of the optical waveguides (1). In the simplest case, these means for coupling out the radiation (4) are, as has likewise already been described, printed or sprayed onto the outer circumferential surface of the optical waveguides (1), with the optical waveguides (1) preferably being rigid, cladding-free rods made of the described glass. If radiation guided in the optical waveguides (1) impinges on the means for coupling out (4), it is reflected into the optical waveguides, passes through them, and is coupled out therefrom laterally. The coupled-out radiation (5) is the used radiation or, in short, the light which will be made available to the user of the lighting device.

Figure 2:
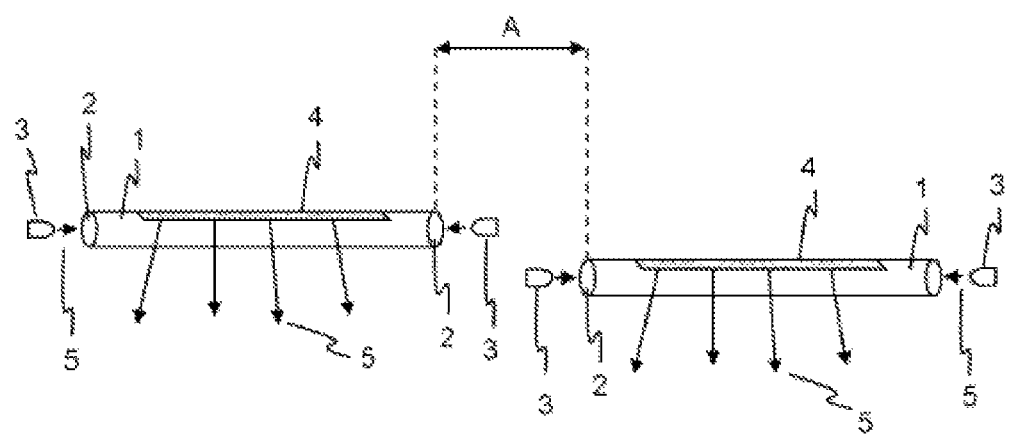
FIG. 2: shows the longitudinal section through a further described lighting device.

In FIG. 1, the optical waveguides (1) are arranged in extension of their longitudinal axes and on said longitudinal axes. For this reason, this arrangement is referred to as a linear arrangement. However, the invention likewise comprises the offset arrangement illustrated in FIG. 2, in which the optical waveguides (1) are arranged parallel with respect to their longitudinal axes but offset with respect to one another. The planes of the end faces (2) are preferably parallel with respect to one another in this case. The LEDs (3) are again arranged in the intermediate space between the two optical waveguides (1), the intermediate space again having the length A. In the offset arrangement, the length A of the intermediate region is measured along the extension of a longitudinal axis of the optical waveguides (1), that is to say not on a diagonal line which would connect the center points of the end faces (2).

Figure 3:
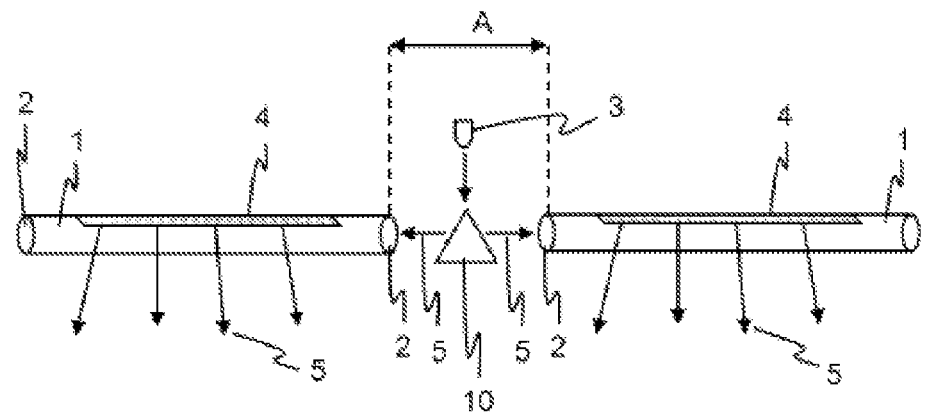
FIG. 3: shows the longitudinal section through a further described lighting device.

FIG. 3 shows an embodiment having a linear arrangement, in which the in the radiation (5) coupled into the optical waveguides (1) through the end faces (2) originates from only one LED (3). Said LED is arranged outside the axis of the optical waveguides (1), the radiation emitted by it is split by the optical element (10) that is arranged in the intermediate space, and directed onto the end faces (2) of the two optical waveguides (1). The optical element (10) can be a prism, which can have side surfaces that are in particular rendered reflective, or an angle mirror as illustrated in FIG. 3. Any other suitable optical element is likewise possible and comprised by the invention.

FIG. 3 likewise shows that the end faces (2) of the optical waveguides (1) that are remote from the intermediate region, as already described, do not necessarily have to be used for injecting radiation. According to the invention, it is merely to be ensured that the end faces (2) of the optical waveguides (1) adjoining the intermediate region are assigned at least one LED (3).

Figure 4:
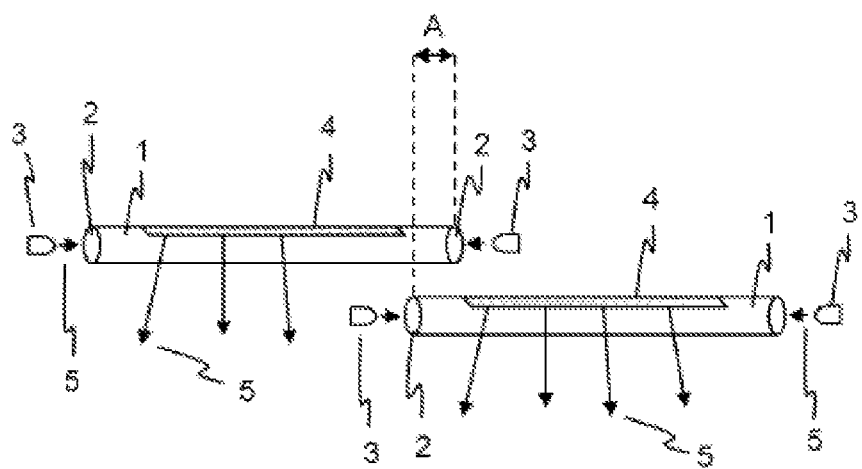
FIG. 4: shows the longitudinal section through a further described lighting device.

FIG. 4 again shows, by way of example, an arrangement which is offset parallel with respect to the longitudinal axes of the optical waveguides (1), in which regions of the optical waveguides (1) overlap. The intermediate region also has a length A, which in this case corresponds to the length of the overlap of the optical waveguides (1). As can be seen in the drawing, it is likewise possible for the planes of the mutually adjacent end faces (2) to be located one on top of the other in the offset arrangement, such that the length A of the intermediate region can take the value 0.

What is generally strived for is an intensity profile which is as homogeneous as possible with a brightness difference ΔI that is as low as possible. This can be achieved by way of a suitable arrangement and configuration of the means for coupling out the radiation (4) in all exemplary embodiments.

Figure 5:
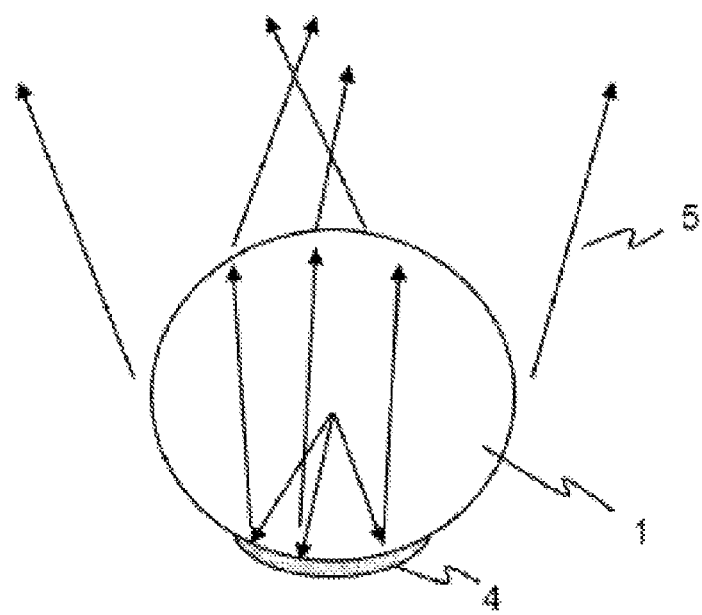
FIG. 5: shows the principle of coupling out light.

The principle of the mode of action of the LED lighting device according to the invention is made clear with reference to FIG. 5. The radiation (5) emitted by the LED (3) in the operating state is guided in the optical waveguide (1) by way of total internal reflection. If the radiation impinges on the means for coupling out (4), which in the figure is located on the outer circumferential surface of the optical waveguide (1) and thus in its outer circumferential surface region, it is reflected into the optical waveguide (1). As a result, the reflected rays pass through the optical waveguide (1) and impinge in a noteworthy proportion on the wall of the optical waveguide (1) at an angle which (measured from the tangent of the wall of the optical waveguide (1)) is greater than the angle of the total internal reflection, such that they are coupled out through the wall of the optical waveguide (1) and are thus available for lighting purposes. It can certainly be desirable here for a certain proportion of the rays to also impinge on the wall of the optical waveguide (1) at an angle which is less than the angle of the total internal reflection. This way, not the entire radiation is immediately coupled out of the optical waveguide (1), but a lighting profile is obtained, which corresponds to the shape of the means for coupling out (4), preferably a line-shaped (including curved lines) lighting profile. The lighting profile itself, i.e. the intensities of the radiation (5) emitted by the lighting device at specific locations, can also, as described, be influenced by the configuration of the means for coupling out (4) the radiation.

Figure 6:
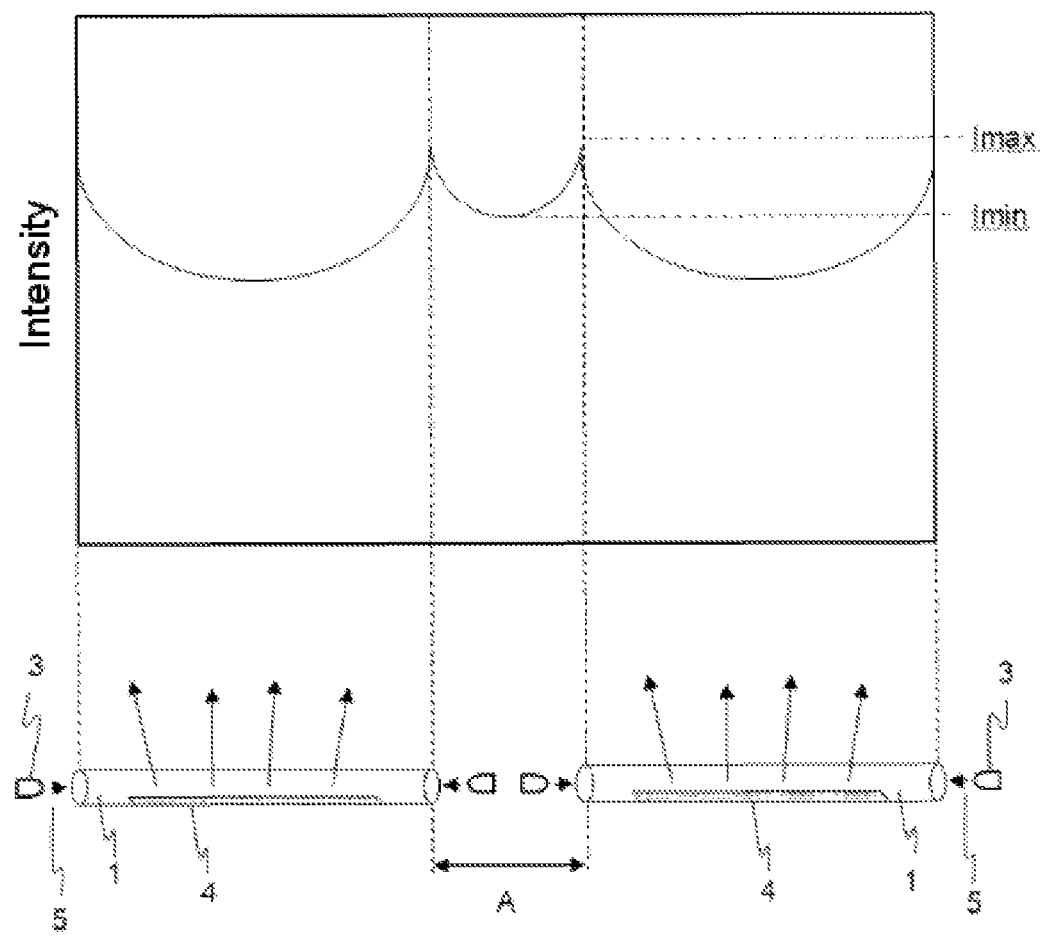
FIG. 6: shows the longitudinal section through a further described lighting device and the corresponding intensity profile.

With the LED lighting device according to the invention, an intensity profile which is as homogeneous as possible and has a brightness difference ΔI which is as low as possible is intended to be produced. This is shown by the fact that the intensity drop across the entire length of the lighting device is intended to be as low as possible. A particular problematic location is here the intermediate region, in which the intensity profile naturally drops. FIG. 6 shows an LED lighting device according to the invention as per the configuration according to FIG. 1 and thereabove the diagram of an intensity profile to be measured here. It illustrates the measured intensity of the radiation (5), which has been directed out of the optical waveguides (1) by the means for coupling out the radiation (4), along the longitudinal axis of the optical waveguides (1), specifically in the direction of the radiation which has been coupled out laterally from the optical waveguides and at a constant distance from the longitudinal axis of the optical waveguides. The highest intensity having the value Imax is obtained in the region of the end faces (2) of the optical waveguides (1). Since each end face (2) is assigned an LED (3), with the same output of the LEDs (3) and the same configuration of the optical waveguides (1) including the means for coupling out the radiation (4), intensity values which are in principle identical are obtained in the region of the end faces (2). The intensity drops to the minimal value Imin in the intermediate region having the length A. The absolute intensity values to be measured in the intermediate region here significantly also depend on the distance during the measurement perpendicular to the longitudinal axis of the optical waveguides (1) and on the length A of the intermediate region. The brightness difference ΔI in the intermediate region is, as described, calculated, using the stated equation, from the difference between Imax and Imin, which is correlated with Imax and expressed in percent. The absolute values of the intensities and thus the radiation output emitted by the LEDs (3) therefore play no role in indicating the brightness difference ΔI.

Figure 7:
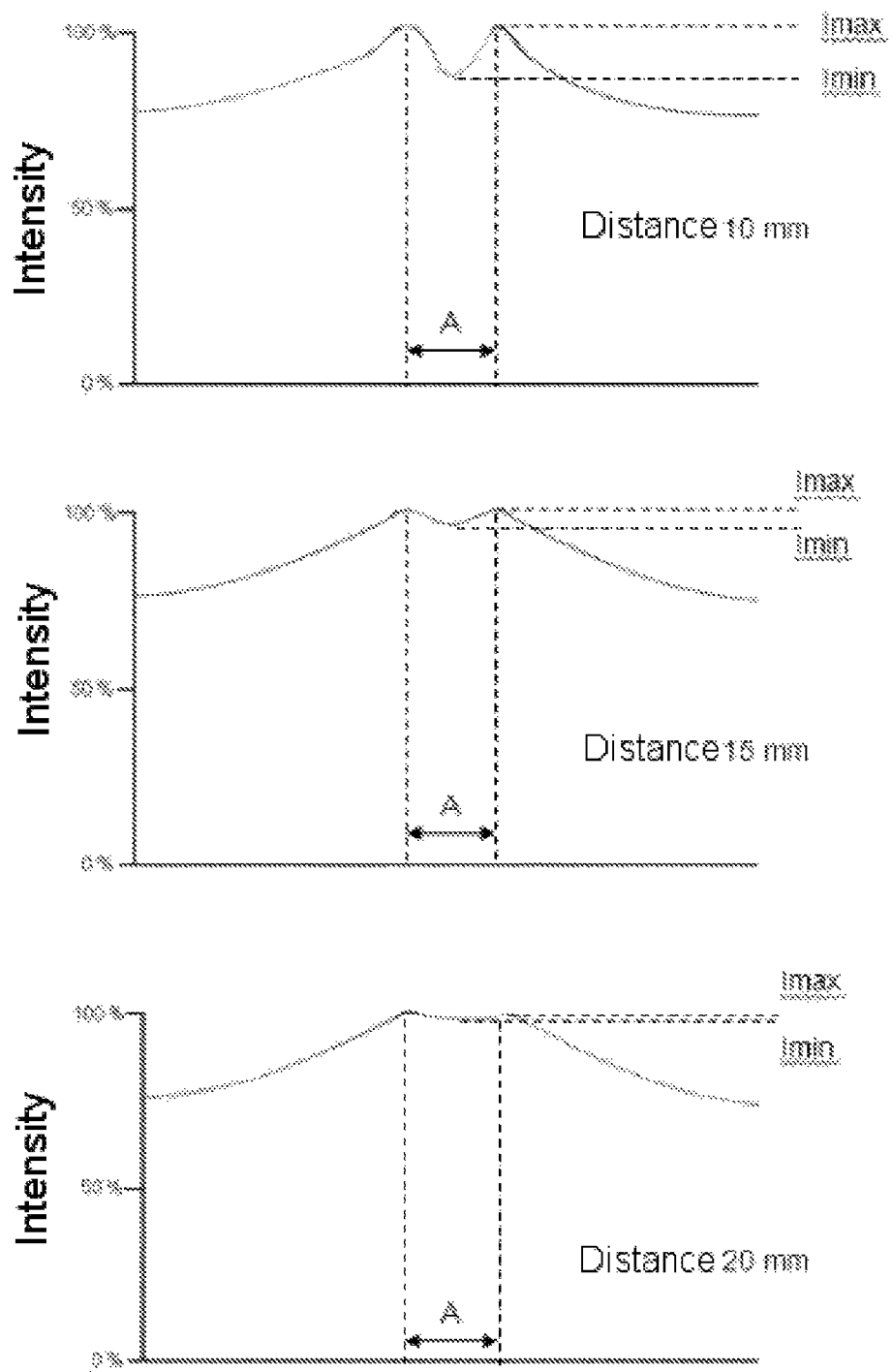
FIG. 7: shows intensity profiles of a lighting device according to FIG. 1 at various distances from the optical waveguides.

FIG. 7 shows the the intensity profiles measured in a real existing lighting device at various distances from the longitudinal axis of the optical waveguides (1) and in arbitrary units. This measured lighting device corresponds to the embodiment according to FIG. 1, but without the LEDs (3) at the end faces (2) of the optical waveguides (3) that are remote from the intermediate region. Therefore, lower intensity values than at the coupling-in locations at the intermediate region are achieved at the ends of the optical waveguides.

The top illustration in FIG. 7 represents the intensity profile at a distance of 10 mm, measured perpendicular to the axis of the optical waveguides, the middle illustration represents the intensity profile at a distance of 15 mm, and the bottom illustration represents the intensity profile at a distance of 20 mm. The length A of the intermediate region is of course identical. The values of the intensities are given in arbitrary units, which do not have to correspond from illustration to illustration. As can be seen, the values of Imin increase as the distance of the measurement relative to Imax increases, such that the difference between Imax and Imin becomes smaller as the distance increases. In arbitrary units, at a distance of 10 mm, the values of Imin and Imax are 50 and 43, respectively, which corresponds to a difference of 7 and thus to a value for ΔI of 14%. At a distance of 15 mm, Imax is, likewise in arbitrary units, 50, but Imin is 48. The difference of 2 leads to a value for ΔI of 4%. At a distance of 20 mm, the value Imax, in arbitrary units, is again 50, but Imin is already 49. The difference is 1, which corresponds to a ΔI of 2%.

Thus, at a distance of 20 mm, almost no difference in these values can be found anymore and thus only an extremely small brightness difference ΔI. Considering that the distance to a user of a lighting device according to the invention is typically at least 1 m and significantly more, this shows that the lighting device according to the invention has a remarkably homogeneous intensity profile, despite the economical number of LEDs.

Figure 8:
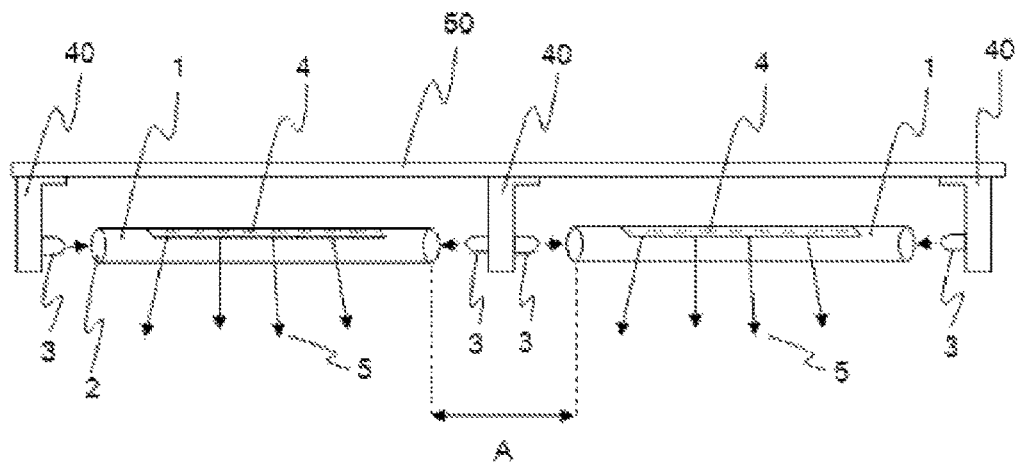
FIG. 8: shows the longitudinal section through a lighting device with carrier and mounting body.

FIG. 8 schematically illustrates the preferred mounting of a lighting device corresponding to the configuration according to FIG. 1. The LEDs (3) are mounted on the carriers (40). The carriers (40) are connected to the mounting body (50). The connection is preferably configured such that thermal conduction from the carriers (40) into the mounting body (50) is possible. The surfaces of the carriers (40) and in particular of the mounting body (50) can thus absorb the heat generated by the LEDs (3) in the operating state in the manner of a heat sink and in particular emit it again by way of their surface. The carriers (40) and mounting body (50) can thus serve as a heat sink.

The mounting body (50) and the carriers (40) are, as described, preferably configured in one part. They preferably consist of a thermally conductive material, in particular a metal (including alloys of metals). Particularly preferred are aluminum and/or copper and/or brass and/or steel, in particular stainless steel. To enhance the cooling effect, the housing body may exhibit measures for enlarging its surface area, for example cooling ribs. The mounting body (50) is again preferably attached to other objects.

Figure 9:
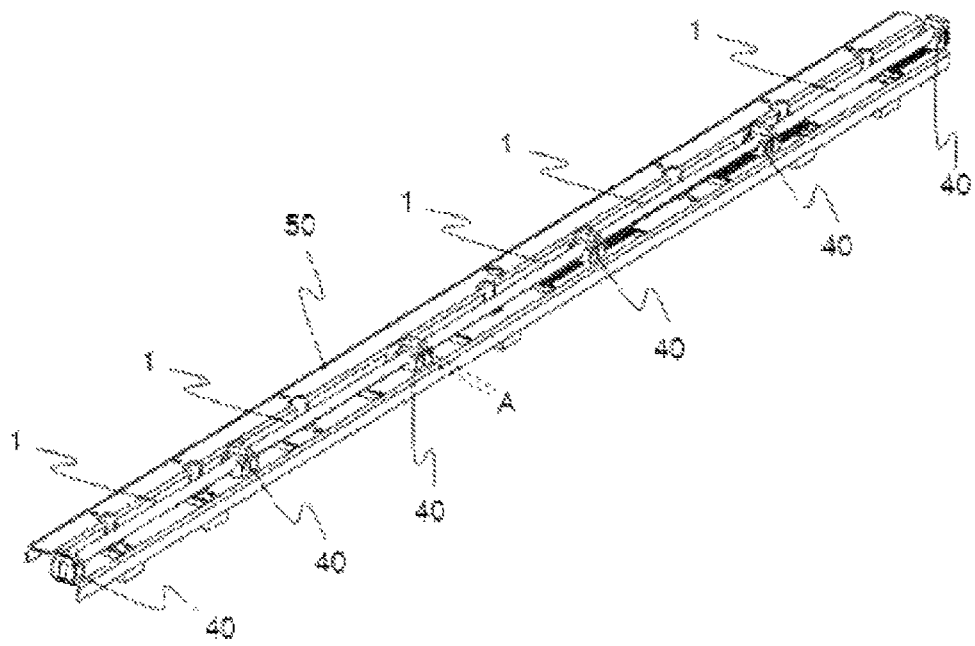
FIG. 9: shows the perspective illustration of a real existing lighting device.

FIG. 9 schematically and perspectively illustrates an advantageous configuration of an LED lighting device according to the invention. This figure likewise represents the exemplary embodiment. Said lighting device has five rigid, rod-shaped optical waveguides (1) made of the mentioned glass which are arranged in extension of their longitudinal axes on said longitudinal axes. Located between the optical waveguides are four intermediate regions having the length A, in the exemplary embodiment 14 mm, in which the carriers (40) are arranged. Located at the ends of the lighting device is again a carrier (40). LEDs are located on the carriers (40), specifically in a manner such that each to end face of the optical waveguides (1) is assigned an LED. The carrier (40) and the mounting body (50) are configured as one part. As can be seen, the profile of the mounting body (50) has an asymmetric shape, the optical waveguides (1) and carriers (40) are arranged on a surface of the L-shaped profile. Electronic components, which are required for example for operating the LEDs, are preferably arranged on the rear of the mounting body (50). The mounting body (50) has holes which are likewise shown and by way of which it can be screw-connected or riveted to other objects.

Figure 10:
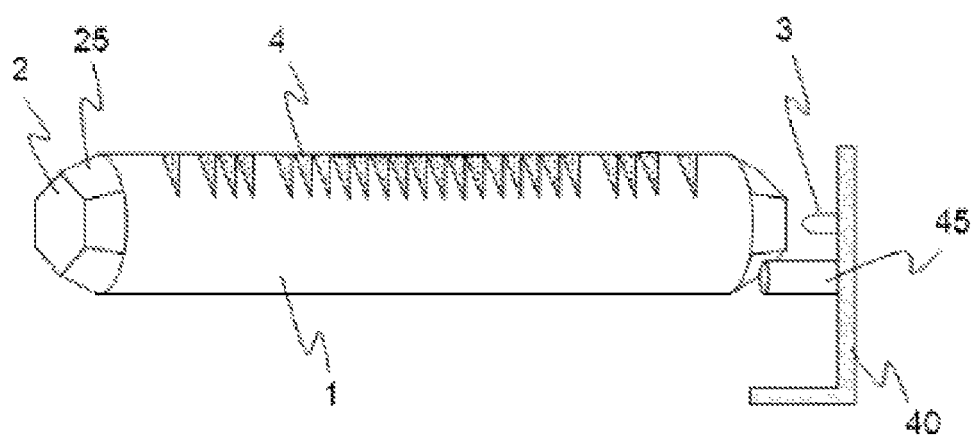
FIG. 10: shows the longitudinal section of an optical waveguide with chamfer and carrier with abutment.

FIG. 10 illustrates in longitudinal section an optical waveguide (1) of a lighting device according to the invention having in each case one chamfer (25) at its ends. The cross-sectional area of the end faces (2) in this example have the shape of a hexagon, the surface area of the end face is smaller than a cross-sectional area through the volume of the optical waveguide (1). Therefore, in top view, the chamfer increases in the direction of the outer circumferential surface. However, a stepped shape is likewise possible. Owing to the hexagonal shape, 6 planar surfaces are formed in the region of the chamfer. Said planar surfaces can be used to define the installation position of the optical waveguide (1). To this end, the carrier (40) has an abutment (45), which is in contact with a planar surface of the chamfer. During operation and upon the occurrence of strong vibrations, the optical waveguide (1) can thus also no longer be twisted with respect to the carrier (40) and thus not with respect to the mounting body (50) either. Owing to the hexagonal shape, individual discrete values for a possible twisting of the optical waveguide (1) are also provided, such that no further adjustment outlay occurs during installation. The twisting of the optical waveguide (1) defines the position of the means for coupling out the radiation (4) and thus the location of the lighting. The means for coupling out (4) are illustrated in the figure as a sawtooth structure, described above, in which the distance between the teeth is varied in order to adjust a desired intensity profile.

FIG. 11 shows the optical waveguide (1) with chamfer (25) and abutment (45) according to FIG. 10 in cross section on the plane of the end face (2).

Figure 12C:
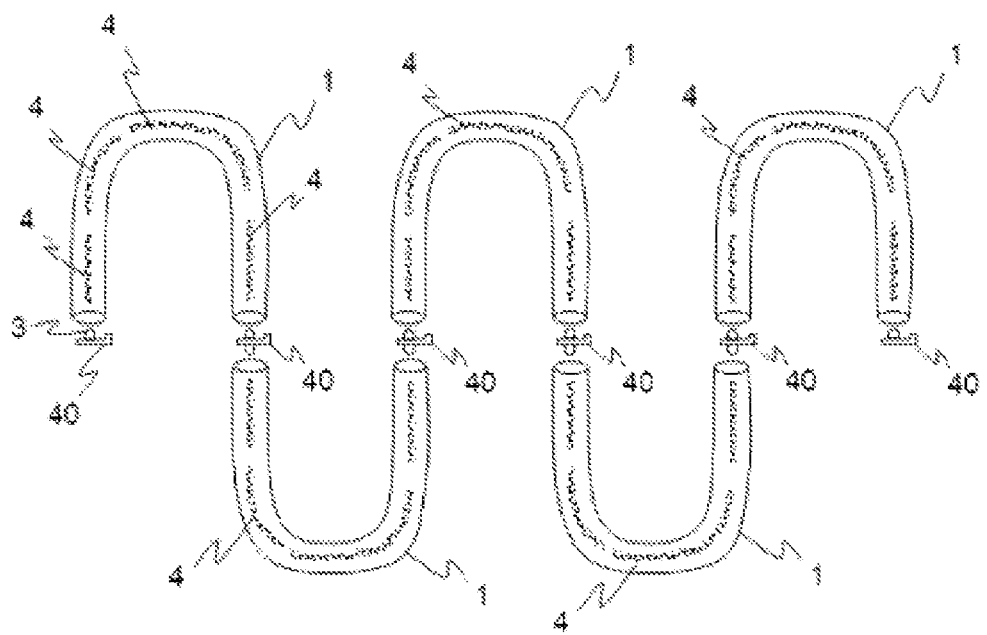
FIG. 12c: shows a described lighting device having a chain with bent optical waveguides.

FIGS. 12a to 12c show examples of LED lighting devices according to the invention having bent rigid rod-shaped optical waveguides (1). In the drawings, the means for coupling out (4) the radiation (5) emitted by the LEDs (3) in the operating state follow the contour of the optical waveguide (1). However, it is likewise possible for them to be arranged on the optical waveguide (1) in any desired shapes. As can be seen from FIG. 12c, the means for coupling out (4) the radiation can also be arranged sectionally on the optical waveguide (1). In this manner, any desired chains with any desired shapes and yet low brightness differences ΔI can be produced.

The embodiments shown in FIGS. 12a to 12c having the bent rigid optical waveguides (1) are preferably used in decorative lighting. Also possible is the use as position lighting in particular in motor vehicles, trucks and/or trains. In these applications, the LED lighting devices and thus the optical waveguides (1) are preferably integrated in the headlights of the vehicles. In this case, the observer sees through the optical waveguides (1) and sees the contour of the means for coupling out (4) glowing in the operating state. Up to now, such shapes have been obtained by arranging a large number of LEDs. The solution used up to now has the disadvantage that the likelihood of failure increases with the number of installed LEDs, since one failing LED results in the headlights having to be replaced. In addition, the LEDs are here perceivable as individual light spots, as a result of which the LEDs must not differ greatly in terms of their brightness and their color space. Therefore, the LEDs must be selected narrowly before their installation, which increases the manufacturing outlay. With an increasing number of LEDs, the statistical likelihood of failure (mean time between failures, MTBF) increases, since lighting devices are generally considered defective on failure of a single LED. The LED lighting device according to the invention makes do with significantly fewer LEDs per headlight, as a result of which the MTBF is significantly increased by the invention.

Figure 13:
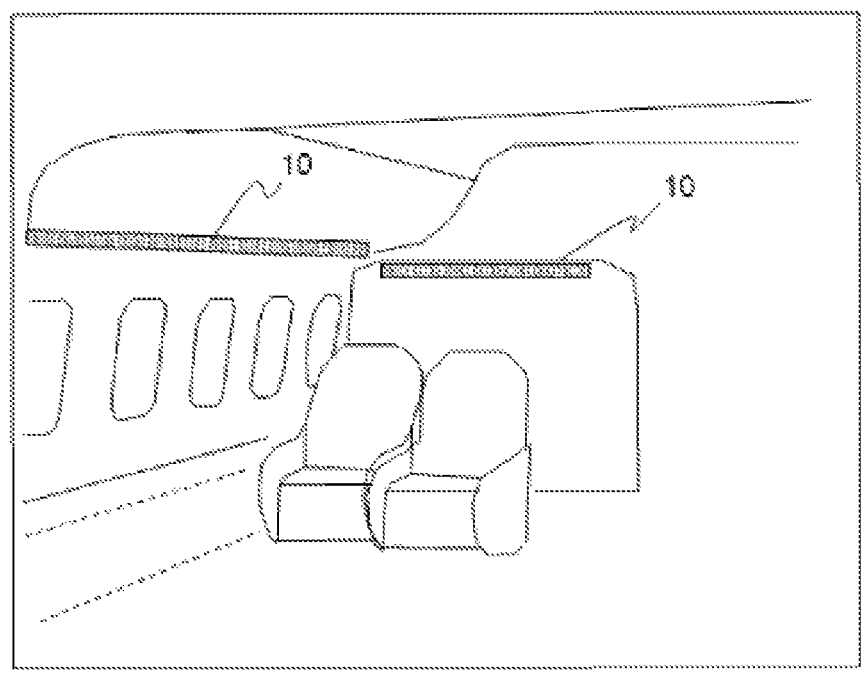
FIG. 13: shows an aircraft interior space with a described lighting device.

FIG. 13 shows, by way of example, a particularly preferred area of use for the LED lighting device according to the invention, specifically for lighting the interior space of an aircraft, in this case a passenger cabin. According to the exemplary embodiment, an LED lighting device according to FIG. 9 was installed in the cabin in place of fluorescent tubes. In addition to the advantages already described with respect to their lack of sensitivity with respect to vibrations and the energy saving qualities, the LED lighting device according to the invention in this application has the further advantage that it can assume a double function of general lighting and ambient lighting, in particular if the LEDs (3) are configured in the form of LED chips, which allow, on account of color mixing, various colors and light scenarios to be realized. It is likewise possible for the LED lighting device according to the invention to be installed behind a panel part so as to achieve indirect lighting, for example as grazing lighting of the cabin ceiling.

The proposed LED lighting devices have, compared to the prior art, the advantage that they make accessible the advantages of LED technology for surface-emission lamps. Owing to the configuration according to the invention and the low brightness differences ΔI obtained thereby in the intermediate regions, it is possible for a uniform intensity of the lighting on larger surface areas and good energy efficiency to be made available. In particular, the LED lighting devices can also be used in environments in which strong vibrations may occur. With appropriate choice of material, they are also fireproof and can be used in environments with high fire safety requirements.

What is claimed is:

1. An LED lighting device comprising:
   at least one LED that emits radiation;
   two separate optical waveguides each having an end face, the two separate optical waveguides being arranged such that the end faces are spaced from one another to form an intermediate region, wherein the radiation is coupled into the end faces adjoining the intermediate region so that the radiation is guided into the optical waveguides;
   a de-coupler on outer circumferential surface regions of each of the two separate optical waveguides, the de-coupler reflecting the radiation guided in the optical waveguides so that the radiation passes through the optical waveguides and is coupled out of the optical waveguides laterally;
   a mounting body; and
   an LED carrier, the mounting body and the LED carrier being thermally conductively connected to one another, the optical waveguides being connected to the mounting body, the at least one LED being mounted on the carrier,
   wherein each optical waveguide has a shape, at least at one end, that interacts with the LED carrier to define an installation position of the de-coupler relative to the mounting body.

2. An LED lighting device comprising:
   at least one LED that emits radiation;
   two separate optical waveguides each having an end face, the two separate optical waveguides being arranged such that the end faces are spaced from one another to form an intermediate region, wherein the radiation is coupled into the end faces adjoining the intermediate region so that the radiation is guided into the optical waveguides;
   a de-coupler on outer circumferential surface regions of each of the two separate optical waveguides, the de-coupler reflecting the radiation guided in the optical waveguides so that the radiation passes through the optical waveguides and is coupled out of the optical waveguides laterally;
   a mounting body; and
   an LED carrier, the mounting body and the LED carrier being thermally conductively connected to one another, the optical waveguides being connected to the mounting body, the at least one LED being mounted on the carrier,
   wherein each optical waveguide has a shape, at least at one end, that interacts with the LED carrier to prevent twisting of the optical waveguides with respect to the LED carrier and the mounting body.

3. The LED lighting device as claimed in claim 1 or 2, wherein the intermediate region comprises no other optical device between the at least one LED and the end faces.

4. The LED lighting device as claimed in claim 1 or 2, wherein the at least one LED is spaced a distance from the end faces of at most 3 mm.

5. The LED lighting device as claimed in claim 1 or 2, wherein the length of the intermediate region is at most 15 mm.

6. The LED lighting device as claimed in claim 1 or 2, wherein the optical waveguides include a glass which contains, in percent by weight on oxide basis:

| | |
|---|---|
| $SiO_2$ | 70-85, |
| $B_2O_3$ | 8-20, |
| $Na_2O + K_2O + Li_2O$ | 2-8, |
| $Al_2O_3$ | 0-7, and |
| $MgO + CaO + BaO + ZnO$ | 0-5. |

7. The LED lighting device as claimed in claim 6, wherein the glass in sum contains at most 50 ppm of $Fe^{2+}$, $Fe^{2+}$, and combinations thereof.

8. The LED lighting device as claimed in claim 1 or 2, wherein the shape is a chamfer.

9. The LED lighting device as claimed in claim 8, wherein the LED carrier has at least one abutment that interacts with the chamfer to define an installation position of the decoupler relative to the mounting body.

10. The LED lighting device as claimed in claim 1 or 2, wherein the shape is a step.

11. The LED lighting device as claimed in claim 1 or 2, wherein the at least one LED comprises a chip having a sensor and a controller that controls the LED.

12. The LED lighting device as claimed in claim 1 or 2, wherein the LED lighting device is configured for lighting a location selected from the group consisting of a street, an alley, a facade, an interior space of a building, furniture, a kitchen appliance, a cooling space, an interior space of a vehicle, contour of lighting of a vehicle, and combinations thereof.

13. The LED lighting device as claimed in claim 1 or 2, wherein the LED lighting device is configured for use for lighting an interior space of a vehicle selected from the group consisting of an aircraft, a train, and a motor vehicle.

14. The LED lighting device as claimed in claim 1 or 2, wherein the two separate optical waveguides are arranged as a linear arrangement.

15. The LED lighting device as claimed in claim 1 or 2, wherein the two separate optical waveguides are arranged as an offset arrangement.

16. The LED lighting device as claimed in claim 1 or 2, wherein the intermediate region has a length that is selected so that a brightness difference, measured perpendicular to an axis of the optical waveguides in the center of the intermediate region, at a distance of 10 mm perpendicular to the axis of the optical waveguides is at most 25% based on a maximum value of brightness along the axis of the optical waveguides.

* * * * *